(12) United States Patent
Huang et al.

(10) Patent No.: US 9,288,629 B2
(45) Date of Patent: Mar. 15, 2016

(54) MOBILE DEVICE POSITIONING SYSTEM

(71) Applicant: Intel Corporation, Santa Clara, CA (US)

(72) Inventors: Yuhuan Huang, Shanghai (CN); Ke Ding, Shanghai (CN); Justin Lipman, Shanghai (CN); Xiaoyong Pan, Shanghai (CN); Weifeng Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,021

(22) PCT Filed: Mar. 18, 2013

(86) PCT No.: PCT/CN2013/072815
§ 371 (c)(1),
(2) Date: Jun. 28, 2013

(87) PCT Pub. No.: WO2014/146233
PCT Pub. Date: Sep. 25, 2014

(65) Prior Publication Data
US 2015/0133143 A1 May 14, 2015

(51) Int. Cl.
*H04W 4/02* (2009.01)
*H04W 64/00* (2009.01)

(52) U.S. Cl.
CPC .............. *H04W 4/028* (2013.01); *H04W 64/00* (2013.01); *H04W 64/006* (2013.01); *H04W 4/026* (2013.01)

(58) Field of Classification Search
CPC .. H04W 28/18; H04W 99/00; G01C 21/3484; G01C 21/3617; G01C 21/3679; G08G 1/096888; G08G 1/096827; G08G 1/096872; G08G 1/096811
See application file for complete search history.

(56) References Cited

U.S. PATENT DOCUMENTS

| 5,572,221 | A | * | 11/1996 | Marlevi et al. | 342/452 |
| 2004/0198426 | A1 | * | 10/2004 | Squibbs et al. | 455/555 |
| 2005/0251325 | A1 | * | 11/2005 | Kudo et al. | 701/200 |
| 2006/0286988 | A1 | * | 12/2006 | Blume et al. | 455/456.1 |
| 2007/0073477 | A1 | * | 3/2007 | Krumm et al. | 701/209 |

FOREIGN PATENT DOCUMENTS

| CN | 1170493 A | 1/1998 |
| CN | 1692671 A | 11/2005 |
| CN | 1885997 A | 12/2006 |

OTHER PUBLICATIONS

International Search Report for PCT Application No. PCT/CN2013/072815, mailed Dec. 26, 2013, 4 pages.

* cited by examiner

*Primary Examiner* — Kashif Siddiqui
(74) *Attorney, Agent, or Firm* — International IP Law Group, P.L.L.C.

(57) ABSTRACT

Techniques for predicting a future location of a mobile device are included herein in which a previous location of the mobile device can be detected. Additionally, a current location of the mobile device can be detected. Furthermore, the future location of the mobile device can be predicted based at least in part on the previous location of the mobile device, the current location of the mobile device, and a location history.

18 Claims, 6 Drawing Sheets

300

MOBILE DEVICE POSITIONING SYSTEM

BACKGROUND

1. Field

This disclosure relates generally to determining the position of a mobile device, and more specifically, but not exclusively, to predicting the future location of a mobile device.

2. Description

A growing number of applications that are developed for mobile devices incorporate location based information to enhance the experience for the user. For example, location based information can allow applications to promote nearby retail stores through advertisements, provide local weather information, and provide real-time traffic information, among others. Applications can use a number of techniques to detect location based information, such as GPS, Wi-Fi, inertial sensors, and cellular radios.

BRIEF DESCRIPTION OF THE DRAWINGS

The following detailed description may be better understood by referencing the accompanying drawings, which contain specific examples of numerous features of the disclosed subject matter.

DESCRIPTION OF THE EMBODIMENTS

As discussed above, many techniques for determining the location of a mobile device have been developed. However, many of these techniques, such as time of arrival, time deference of arrival, observed time deference, enhanced observed time deference, and direction of arrival, among others, implement location determination using modified equipment. For example, these techniques may be implemented with modified equipment in a base station or modified equipment in a mobile device, which enables measurements to be detected for location determination and modified signals to transfer the measurement results to a location determination unit. Additionally, signal strength technology can determine the location of a device using the signals of at least three neighboring base stations to locate the device with trilateration calculation. However, trilateration calculation is not possible in many rural areas in which three base stations cannot be accessed simultaneously. Furthermore, to assure quality of service and eliminate the signal disturbance from other base stations, many mobile devices do not support reporting base stations that are proximate to the current base station being accessed by a mobile device.

According to embodiments of the subject matter described herein, the future location of a mobile device can be predicted. In some embodiments, the future location of a mobile device can be predicted using enhanced mobile device identification techniques. For example, the direction that a mobile device is traveling can be predicted based on the previous location of the mobile device, the current location of the mobile device, and previously traveled paths. In some examples, the previously traveled paths of a mobile device can be stored, which enables the prediction of the most likely path a mobile device is to travel based on a previous location and a current location.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
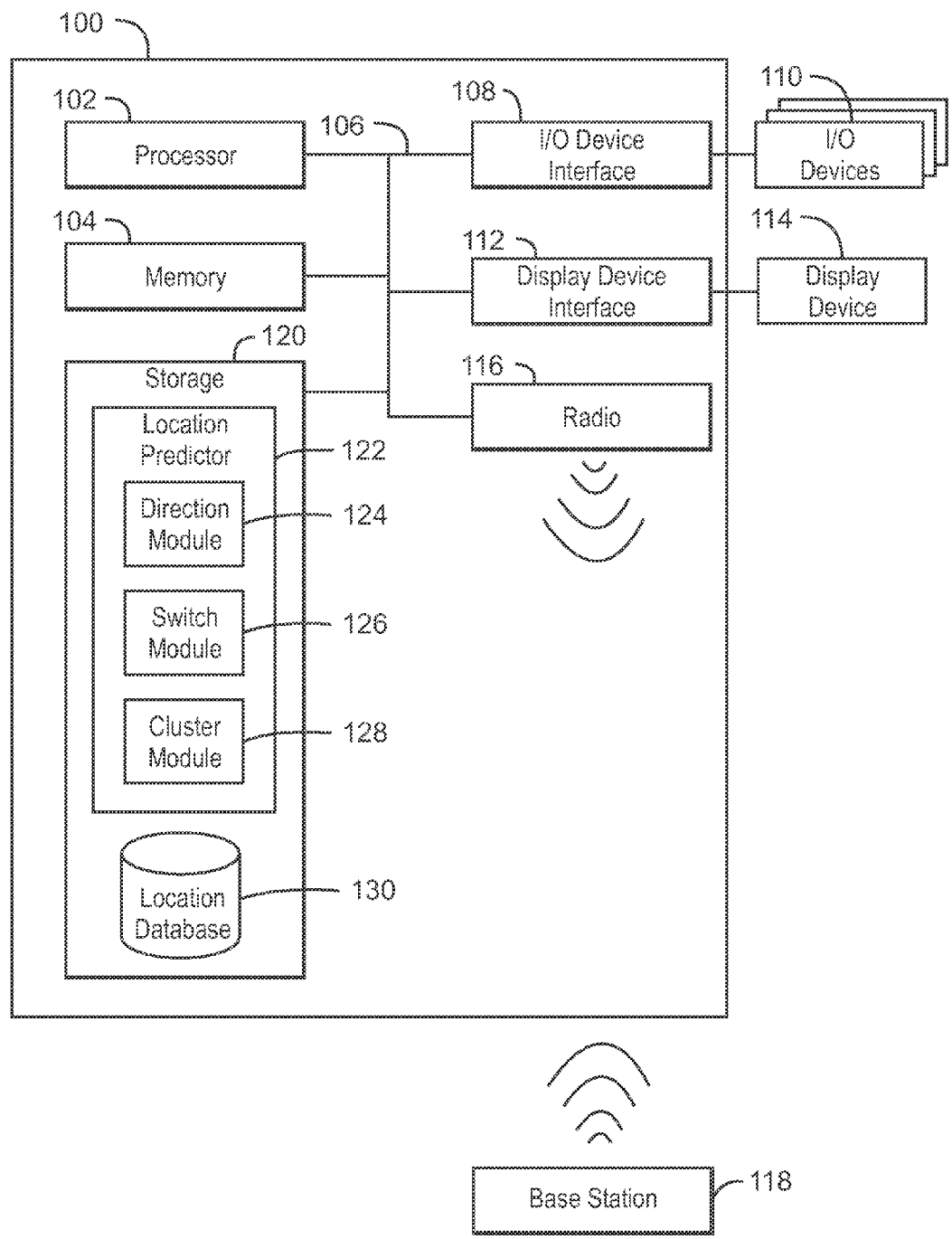
FIG. 1 is a block diagram of an example of a mobile device that can predict the future location of the mobile device.

FIG. 1 is a block diagram of an example of a mobile device that can predict the future location of the mobile device. The mobile device 100 may be, for example, a mobile phone, laptop computer, desktop computer, or tablet computer, among others. The mobile device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that predicts the future location of the mobile device.

The processor 102 may be connected through a system interconnect 106 (e.g., PCI®, PCI-Express®, HyperTransport®, NuBus, etc.) to an input/output (I/O) device interface 108 adapted to connect the mobile device 100 to one or more I/O devices 110. The I/O devices 110 may include, for example, a keyboard and a pointing device, wherein the pointing device may include a touchpad or a touchscreen, among others. The I/O devices 110 may be built-in components of the mobile device 100, or may be devices that are externally connected to the mobile device 100.

The processor 102 may also be linked through the system interconnect 106 to a display interface 112 adapted to connect the mobile device 100 to a display device 114. The display device 114 may include a display screen that is a built-in component of the mobile device 100. The display device 114 may also include a computer monitor, television, or projector, among others, that is externally connected to the mobile device 100. In addition, a cellular radio (also referred to herein as a radio) 116 may be adapted to connect the mobile device 100 through the system interconnect 106 to a network (not depicted). The network (not depicted) may be a cellular network, a radio network, a wide area network (WAN), a local area network (LAN), or the Internet, among others. In some embodiments, the cellular radio 116 can connect the mobile device 100 to a network through a base station 118. A base station, as referred to herein, can include a fixed location transceiver, a receiver, or a transmitter, among others.

The storage device 120 can include a hard drive, an optical drive, a USB flash drive, an array of drives, or any combinations thereof. The storage device 120 may include a location predictor 122 that can predict the future location of the mobile device 100. In some embodiments, the location predictor 122 can include a direction module 124, a switch module 126, and a cluster module 128. In one embodiment, the direction module 124 can determine the direction of the mobile device 100 based on the current location of the mobile device 100 and the previous location of the mobile device 100. In some examples, the direction module 124 may generate a direction vector based on any suitable number of previous locations of the mobile device 100 along with the current location of the mobile device 100. In one example, the direction vector that indicates the direction that a mobile device 100 is travelling may be more accurate with a larger number of previous locations.

In some embodiments, the location predictor 122 can indicate each location of a mobile device 100 based on the closest base station 118. For example, the previous locations of the mobile device 100 can be indicated by the various base stations 118 that the mobile device 100 previously accessed. In some embodiments, a base station 118 can communicate with a mobile device 100 within a coverage area. For example, a base station 118 may reside in the center of a coverage area. The coverage area of each base station 118 can include any suitable geometric shape such as a circle, a square, or a rectangle, among others.

In some embodiments, the switch module 126 can indicate which base station 118 a mobile device 100 is to use for determining the current location. For example, the switch module 126 may determine the intersection point between two coverage areas that correspond to two base stations 118. The switch module 126 may also determine that a mobile device 100 has moved beyond the intersection of the two coverage areas. In some embodiments, the switch module 126 can switch the base station 118 with which the mobile device 100 communicates. For example, the switch module 126 can switch communication between a current base station and a mobile device 100 to a second base station and a mobile device 100 if the second base station is beyond the intersection of the coverage areas of the current base station and the second base station. The switch module 126 is discussed in greater detail below in relation to FIGS. 3, 4A, and 4B.

In some embodiments, the cluster module 128 can aggregate or group multiple base stations 118 into a single coverage area. For example, the mobile device 100 may store location information pertaining to any suitable number of base stations 118 within a particular region as a single base station. In one embodiment, the cluster module 128 can account for minor deviations in previously traveled paths through urban environments. For example, a mobile device 100 may be able to communicate with multiple base stations 118 from a particular location. The mobile device 100 may communicate with a base station 118 depending on temporary physical obstacles, or weather, among others. The cluster module 128 can account for such temporary obstructions by aggregating a group of base stations 118 within a close proximity together. In some embodiments, the location predictor 122 can use the direction module 124, the switch module 126, and the cluster module 128 together to accurately predict the future location of the mobile device 100.

In some embodiments, the storage device 120 can also include a location database 130 that stores the previous location history of a mobile device 100. For example, the location database 130 may include the base stations 118 with which a mobile device 100 has communicated, along with a switch history that indicates the sequential order of base stations accessed by the mobile device 100. In some examples, the location database 130 may also include the number of times a mobile device 100 has accessed a particular sequence of base stations 118. For example, the location database 130 may store the number of times a mobile device 100 communicates with a first base station before communicating with a second base station. In one embodiment, the location database 130 may also store the previous location history for any suitable number of mobile devices.

It is to be understood that the block diagram of FIG. 1 is not intended to indicate that the mobile device 100 is to include all of the components shown in FIG. 1. Rather, the mobile device 100 can include fewer or additional components not illustrated in FIG. 1 (e.g., additional memory components, additional modules, additional network interfaces, etc.). Furthermore, any of the functionalities of the location predictor 122 may be partially, or entirely, implemented in hardware and/or in the processor 102. For example, the functionality may be implemented with an application specific integrated circuit, or in logic implemented in the processor 102, among others.

Figure 2:
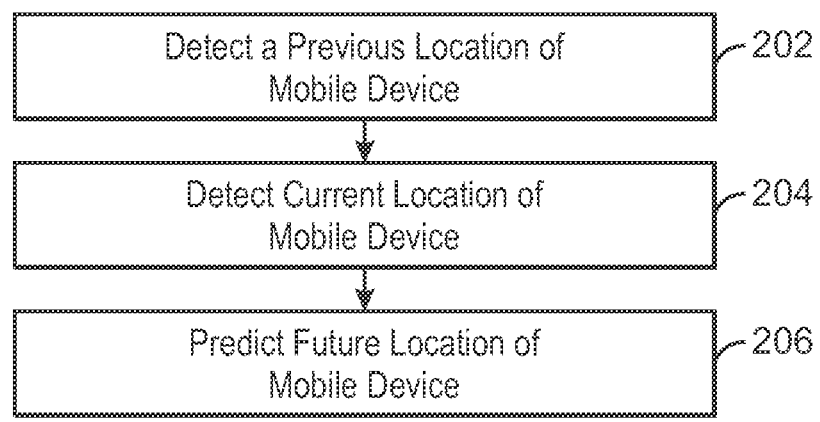
FIG. 2 is a process flow diagram illustrating an example of a method that can predict the future location of a mobile device.

FIG. 2 is a process flow diagram illustrating an example of a method that can predict the future location of a mobile device. The method 200 can be implemented with any suitable mobile device, such as mobile device 100 of FIG. 1.

At block 202, the location predictor 122 can detect a previous location of the mobile device. As discussed above, the location of a mobile device can be detected by the base station which communicates with a mobile device. For example, a base station may detect the location of a mobile device if the mobile device is within the coverage area of the base station. In some embodiments, the location predictor 122 can detect any suitable number of previous locations of the mobile device. For example, the location predictor 122 may detect the path a mobile device traveled by detecting any suitable number of base stations that communicated with the mobile device. A path, as referred to herein, can include a list of sequentially accessed base stations.

At block 204, the location predictor 122 can detect a current location of the mobile device. As discussed above, the current location of the mobile device can be determined by detecting the base station that is communicating with the mobile device. For example, the current location of the mobile device can correspond to a point within the coverage area of the base station which is communicating with the mobile device.

At block 206, the location predictor 122 can predict the future location of the mobile device based at least in part on the previous location of the mobile device, the current location of the mobile device, and a location history. In some embodiments, the location history can include any suitable number of previously traveled paths. For example, a mobile device may frequently travel along a path that includes particular base stations. The location predictor 122 can use the location history of a mobile device to determine a probability that the mobile device will access a particular base station subsequent to the current location of the mobile device.

In some embodiments, the location predictor 122 detects that the signal strength between the mobile device and a base station is decreasing. The location predictor 122 can use the location history of the mobile device to determine the most likely base station that the mobile device will communicate with next. For example, the location predictor 122 can detect if the location history indicates that the mobile device has previously accessed the current base station before switching to a particular subsequently accessed base station. In other examples, the location predictor 122 can predict that a mobile device will access a base station based on a switch record that appears the most frequently. A switch record, as referred to herein, can indicate the sequential order of base stations accessed by a mobile device. For example, a mobile device may switch between a first base station and a second station more often than between a first base station and additional base stations. In some embodiments, the location predictor 122 can also predict the future location of a mobile device based on prioritizing base station use, or by determining the mobile device is traveling away from a base station in a particular direction.

In some embodiments, the location predictor 122 can detect the previous location of the mobile device, the current location of the mobile device, and the future location of the mobile device by aggregating base stations into a base station group. A base station group, as referred to herein, includes a group of base stations with overlapping coverage areas. For example, any suitable number of base stations may be close in proximity, such as base stations in an urban environment. The location predictor 122 can enhance the accuracy of predicting the next base station that the mobile device is to access by detecting the current location within a base station group. The base station group can provide a general direction the mobile device is travelling, rather than tracking the direction of a mobile device through several base stations that are close in proximity to one another.

The process flow diagram of FIG. 2 is not intended to indicate that the operations of the method 200 are to be executed in any particular order, or that all of the operations of the method 200 are to be included in every case. For example, the location predictor 122 may not detect the location of a mobile device by aggregating base stations into a base station group. Additionally, the method 200 may also include providing a location based service with the future location of the mobile device. For example, the location predictor 122 may provide location based services, such as real-time traffic, weather updates, or orientation information, based on the future location of the mobile device.

Figure 3:
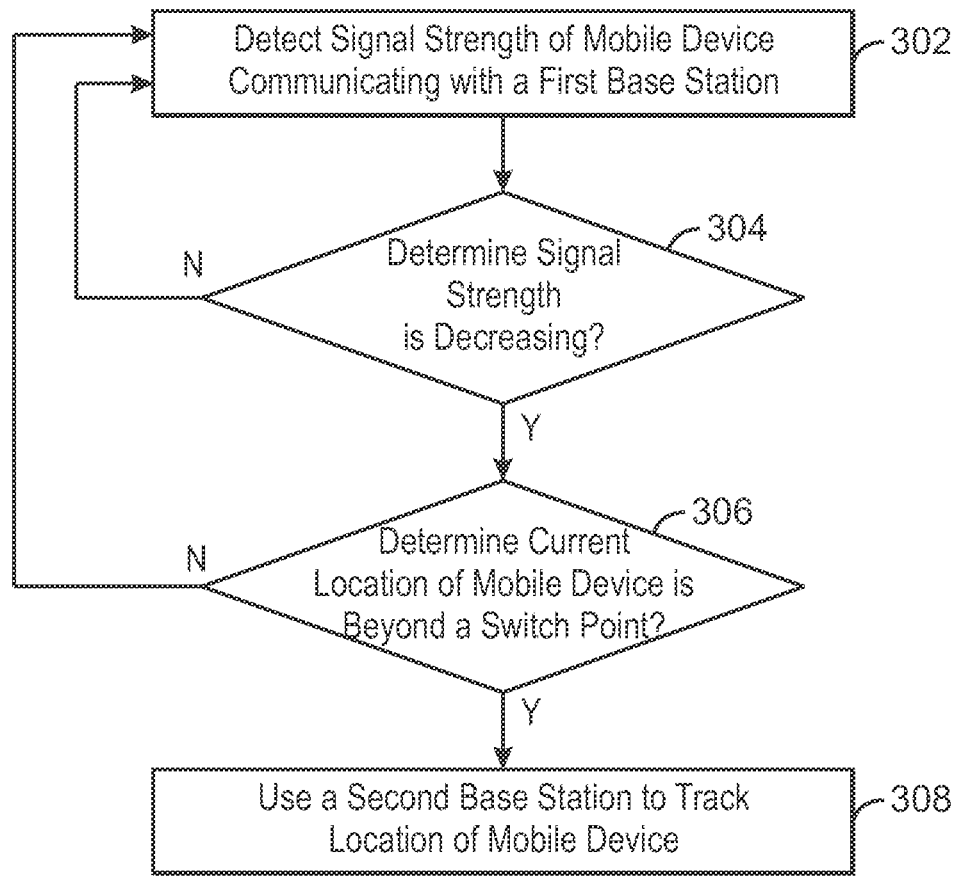
FIG. 3 is a process flow diagram illustrating an example of a method that can track the direction of a mobile device using a switch point.

FIG. 3 is a process flow diagram illustrating an example of a method that can track the direction of a mobile device using a switch point. The method 300 can be implemented with a mobile device, such as the mobile device 100 of FIG. 1.

At block 302, the switch module 126 can detect the signal strength of a mobile device communicating with a first base station. The signal strength of the mobile device can be detected using any suitable technique, such as retrieving data directly from any suitable radio frequency device (e.g., a radio-frequency transceiver module inside the mobile device, among others). Detecting the signal strength of a mobile device can allow the switch module 126 to determine the distance between a base station and a mobile device using any suitable technique, such as the Okumura model, the Hata model, or the COST-Hata model. For example, the switch module 126 can calculate the location of a mobile device by adding the distance that the mobile device has traveled subsequent to the last location based on signal strength in the last location and signal strength in the current location.

At block 304, the switch module 126 can detect that the signal strength of a mobile device is decreasing. In some embodiments, the signal strength of a mobile device decreases as the distance between a base station and a mobile device increases. For example, as a mobile device travels to the edge of the coverage area for a base station, the signal strength may decrease. If the signal strength of a mobile device is increasing, the process flow returns to block 302 because the mobile device is moving toward the base station. If the signal strength of a mobile device is decreasing, the process flow continues at block 306.

At block 306, the switch module 126 determines if the current location of a mobile device is beyond a switch point. As discussed above, a switch point, as referred to herein, indicates a point between two base stations at which a mobile device has the same signal strength with each of the two base stations. In some embodiments, as the signal strength of a mobile device decreases, the accuracy of detecting the location of the mobile device also decreases. If the switch module 126 determines that the current location of the mobile device is not beyond a switch point, the process flow returns to block 302. If the switch module 126 determines that the current location of the mobile device is beyond a switch point, the process flow continues at block 308.

At block 308, the switch module 126 uses a second base station to track the location of a mobile device. In some embodiments, the signal strength between a mobile device and a second base station may be stronger than the signal strength between a mobile device and a fist base station. For example, the coverage areas of two base stations may overlap and the switch point may reside in the overlapping section of the coverage areas for two base stations. As discussed above, the switch point may indicate that a second base station can track the mobile device with greater accuracy than a first base station because the mobile device has a stronger signal strength from the second base station.

The process flow diagram of FIG. 3 is not intended to indicate that the operations of the method 300 are to be executed in any particular order, or that all of the operations of the method 300 are to be included in every case. Additionally, the method 300 may also include the switch module 126 detecting a second base station from any suitable number of base stations within a base station group. For example, the switch module 126 may determine that after the mobile device crosses a switch point, the mobile device can receive a signal from multiple base stations in a base station group.

Figure 4A:
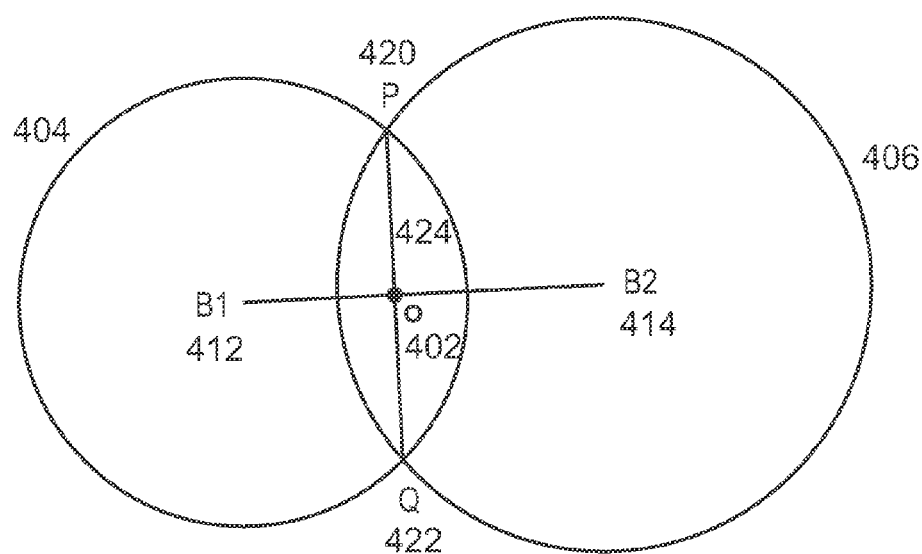
FIGS. 4A and 4B illustrate examples of detecting a switch point for a mobile device.
Figure 4B:
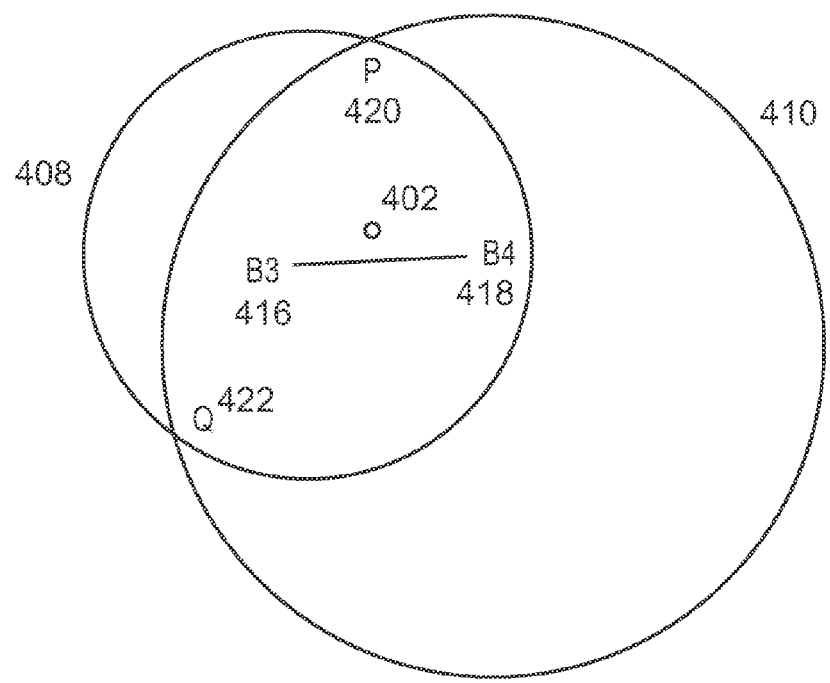

FIGS. 4A and 4B illustrate examples of detecting a switch point for a mobile device. In FIGS. 4A and 4B, the switch point is referred to as O 402. Each circle 404, 406, 408, and 410 represents a coverage area for a base station. For example, circle 404 represents the coverage area for base station 1 (also referred to herein as B1) 412, circle 406 represents the coverage area for base station 2 (also referred to herein as B2) 414, circle 408 represents the coverage area for base station 3 (also referred to herein as B3) 416, and circle 410 represents the coverage area for base station 4 (also referred to herein as B4) 418. The points P 420 and Q 422 represent the endpoints of a line 424 that represents the intersection of the coverage areas represented by circles 404 and 406.

In some embodiments, a midpoint along the line of FIG. 4A represents the switch point O 402. As discussed above, the switch point O 402 can represent the point at which the signal strength for two base stations B1 412 and B2 414 or B3 416 and B4 418 are the same. For example, a base station B1 412 or B3 416 may track the location of a mobile device based on the signal strength of the mobile device. When the mobile device crosses the switch point O 402, the base station B2 414 or B4 418 may begin to track the location of the mobile device rather than base station B1 412 or base station B3 416. In some examples, the switch point O 402 may be calculated based on any suitable variables such as physical obstacles, the amount of power emitted by each base station, among others.

In some embodiments, additional points between two coverage areas 404, 406, 408, or 410 can be selected as a switch point O 402. For example, FIG. 4B depicts an example in which there is a large amount of overlapping coverage area between base station B3 416 and base station B4 418. In one example, the midpoint between base station B3 416 and base station B4 418 is selected as the switch point O 402 because the intersection of the coverage areas 408 and 410 does not include a point between base station B3 416 and base station B4 418. In some embodiments, any radio frequency device can determine the signal strength of the mobile device, which enables the detection of the location of a mobile device with any suitable radio propagation model. For example, the radio propagation model may include a HATA model, a COST-HATA model, or an Okumura model, among others.

Figure 5:
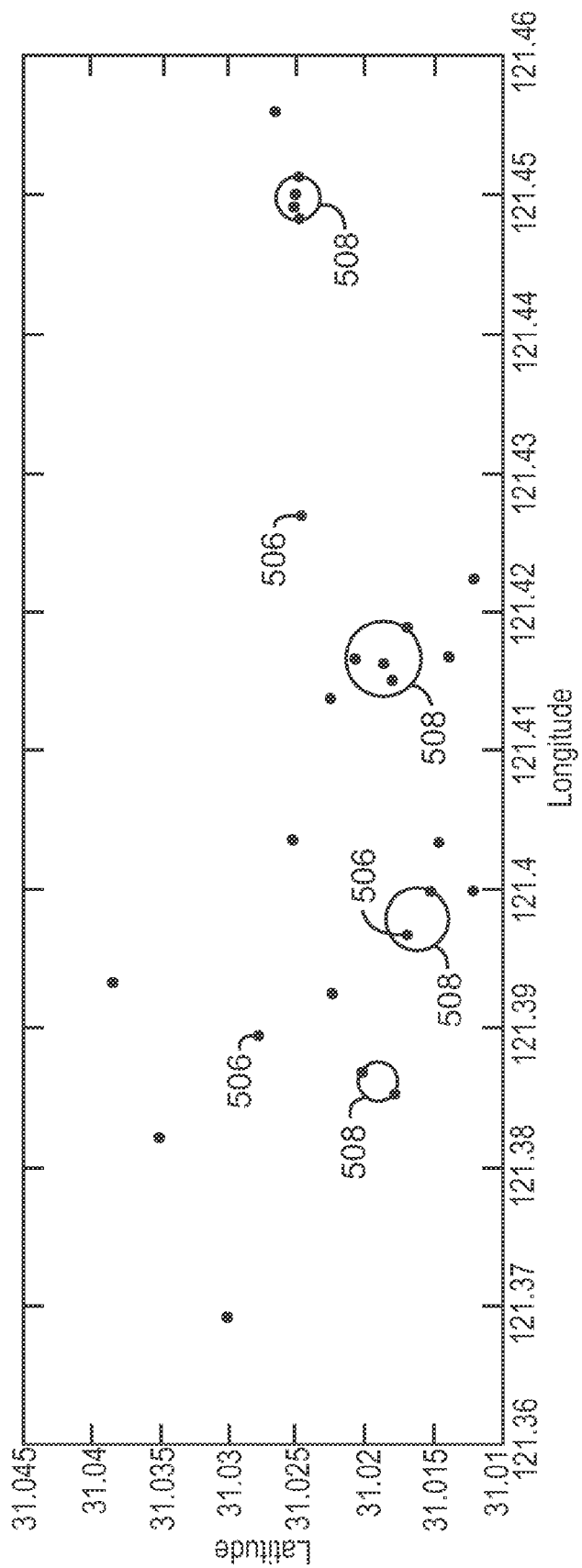
FIG. 5 is an example of a chart that illustrates predicting the future location of a mobile device based on aggregated base stations.

FIG. 5 is an example of a chart that illustrates predicting the future location of a mobile device based on aggregated base stations. As discussed above, aggregating any suitable number of base stations that are located in close proximity can enhance the accuracy of predicting the future location of a mobile device. For example, a mobile device may communicate with different base stations from one location depending on various temporary variables such as the weather, physical obstacles, or different orientations, among others. To account for temporary variables, base stations in close proximity to one another may be grouped together to form a base station group.

The chart 500 includes the longitude 502 and latitude 504 of base stations 506, which are indicated by dots. As the chart 500 illustrates, some base stations 506 are located at longitudes 502 and latitudes 504 that are close in proximity. In some embodiments, a base station group can be formed that includes any suitable number of base stations 506 that are close in proximity. The base station groups are depicted as circles 508 in chart 500.

Figure 6:
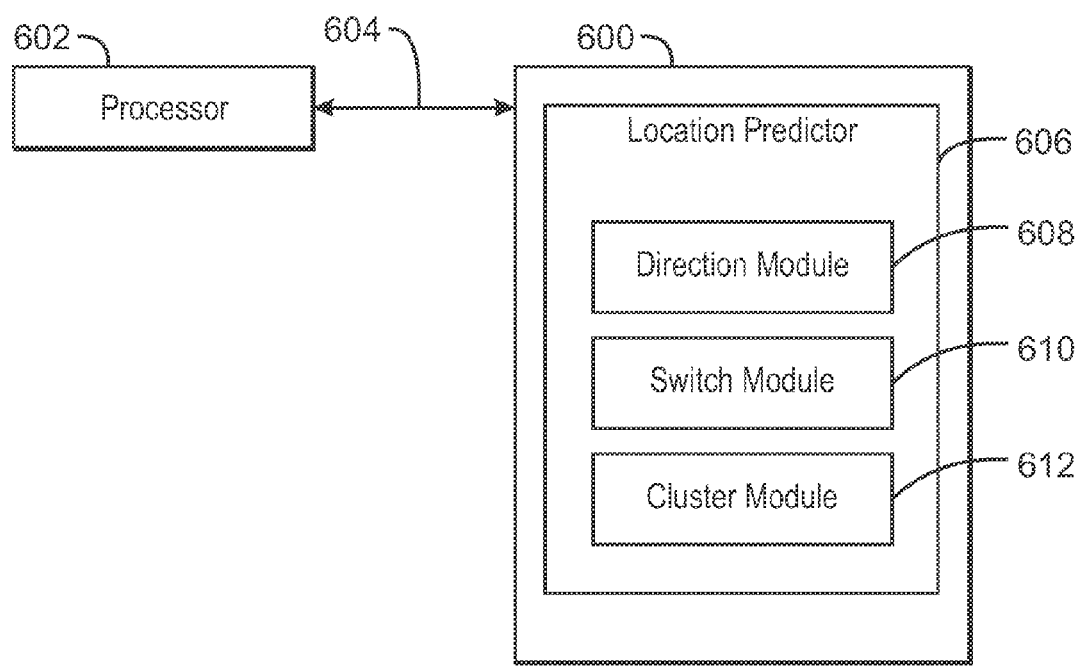
FIG. 6 is a block diagram depicting an example of a tangible, non-transitory computer-readable medium that can predict the future location of a mobile device.

FIG. 6 is a block diagram of an example of a tangible, non-transitory computer-readable medium that can predict the future location of a mobile device. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the current method.

The various software components discussed herein may be stored on the tangible, non-transitory, computer-readable medium 600, as indicated in FIG. 6. For example, a location predictor 606 may be adapted to direct the processor 602 to predict the future location of a mobile device. In some embodiments, the location predictor 606 comprises a direction module 608, a switch module 610, and a cluster module 612. In one embodiment, the direction module 608 can detect the direction a mobile device is traveling based on previous locations of the mobile device and a current location of the mobile device along with a location history. The switch module 610 can determine the base station to use to detect the current location of the mobile device based on signal strength between the mobile device and a base station. In some embodiments, the switch module 610 can enhance the accuracy of the direction module 608 by using the switch point to calibrate the current location of a mobile device. The cluster module 612 can detect that multiple base stations are within close proximity to one another and create a base station group that includes any suitable number of base stations.

It is to be understood that any number of additional software components not shown in FIG. 6 may be included within the tangible, non-transitory, computer-readable medium 600, depending on the specific application. Furthermore, any number of the modules within the location predictor module 606 can predict the future location of a mobile device.

Example 1

A method for predicting a future location of a mobile device is described herein. The method can include detecting a previous location of the mobile device and detecting a current location of the mobile device. The method can also include predicting the future location of the mobile device based at least in part on the previous location of the mobile device, the current location of the mobile device, and a location history.

In some embodiments, the location history comprises a set of previously traveled paths by the mobile device. A previously traveled path can include a list of sequentially accessed base stations. In one embodiment, the location history can also include a set of previously traveled paths by a plurality of mobile devices. The future location of the mobile device can be based on the location history for any suitable number of the plurality of mobile devices.

Example 2

A mobile device for predicting a future location of the mobile device is also described herein. The mobile device can include a radio to communicate with a first base station, a processor to execute stored computer-readable instructions, and a storage device that stores computer-readable instructions. The computer-readable instructions, when executed by the processer, direct the processor to detect a previous location of the mobile device and detect a current location of the mobile device in relation to the first base station. The computer-readable instructions also direct the processor to predict the future location of the mobile device based at least in part on the previous location of the mobile device, the current location of the mobile device, and a location history.

In some embodiments, the computer-readable instructions can also direct the processor to detect a signal strength of the mobile device at the current location with the first base station, determine the signal strength of the mobile device is decreasing, determine the current location of the mobile device is beyond a switch point, and use a second base station to track the position of the mobile device. In one examples, the switch point is the intersection between a coverage area of the first base station and a coverage area of the second base station.

Example 3

A non-transitory, computer-readable medium comprising a plurality of instructions is also disclosed herein. In response to being executed on a mobile device, the instructions cause the mobile device to detect a previous location of the mobile device and detect a current location of the mobile device in relation to a first base station. The instructions also cause the mobile device to predict the future location of the mobile device based at least in part on the previous location of the mobile device, the current location of the mobile device, and a location history. Additionally, the instructions cause the mobile device to provide a location based service with the future location of the mobile device.

In some embodiments, the instructions cause the mobile device to direct the processor to detect a signal strength of the mobile device at the current location with the first base station, determine the signal strength of the mobile device is decreasing, determine the current location of the mobile device is beyond a switch point, and use a second base station to track the position of the mobile device. The instructions can also cause the mobile device to detect a base station group beyond the switch point, and select the second base station from the base station group. In one example, the signal strength indicates a distance between the mobile device and the first base station.

Example 4

An apparatus for predicting a future location of the mobile device is described herein. The apparatus includes means for detecting a previous location of the mobile device and means for detecting a current location of the mobile device in relation to a first base station. The apparatus also includes means for predicting the future location of the mobile device based at least in part on the previous location of the mobile device, the current location of the mobile device, and a location history. Furthermore, the apparatus includes means for providing a location based service with the future location of the mobile device.

In some embodiments, the apparatus includes means for detecting a signal strength of the mobile device at the current location with the first base station, means for determining the signal strength of the mobile device is decreasing, means for determining the current location of the mobile device is beyond a switch point, and means for using a second base station to track the position of the mobile device. The apparatus can also include means for detecting a base station group beyond the switch point, and means for selecting the second base station from the base station group. In one example, the signal strength indicates a distance between the mobile device and the first base station.

Although an example embodiment of the disclosed subject matter is described with reference to block and flow diagrams in FIGS. 1-6, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for predicting a future location of a mobile device comprising:
   detecting a previous location of the mobile device;
   detecting a current location of the mobile device by detecting a signal strength of the mobile device with a first base station, determining the signal strength of the mobile device is decreasing, determining the mobile device is beyond a switch point, and using a second base station to track the current location of the mobile device; and
   predicting the future location of the mobile device based at least in part on the previous location of the mobile device, the current location of the mobile device, and a location history.

2. The method of claim 1, wherein the location history comprises a set of previously traveled paths by the mobile device.

3. The method of claim 1, wherein the switch point is the intersection between a coverage area of the first base station and a coverage area of the second base station.

4. The method of claim 3, comprising:
   detecting a base station group beyond the switch point; and selecting the second base station from the base station group.

5. The method of claim 1, wherein the location history comprises a set of previously traveled paths by a plurality of mobile devices.

6. The method of claim 1, wherein the signal strength indicates a distance between the mobile device and the first base station.

7. A mobile device for predicting a future location of the mobile device comprising:
- a radio to communicate with a first base station;
- a processor to execute stored computer-readable instructions; and
- a storage device that stores computer-readable instructions that, when executed by the processor, direct the processor to:
  - detect a previous location of the mobile device;
  - detect a current location of the mobile device in relation to the first base station, wherein the computer-readable instructions direct the processor to detect the current location based on a decreasing signal strength of the mobile device with the first base station, determine the mobile device is beyond a switch point, and use a second base station to track the current location of the mobile device; and
  - predict the future location of the mobile device based at least in part on the previous location of the mobile device, the current location of the mobile device, and a location history.

8. The mobile device of claim 7, wherein the location history comprises a set of previously traveled paths by the mobile device.

9. The mobile device of claim 7, wherein the switch point is the intersection between a coverage area of the first base station and a coverage area of the second base station.

10. The mobile device of claim 9, wherein the computer-readable instructions direct the processor to:
- detect a base station group beyond the switch point; and
- select the second base station from the base station group.

11. The mobile device of claim 7, wherein the location history comprises a set of previously traveled paths by a plurality of mobile devices.

12. The mobile device of claim 7, wherein the signal strength indicates a distance between the mobile device and the first base station.

13. A non-transitory, computer-readable medium comprising a plurality of instructions that, in response to being executed on a mobile device, cause the mobile device to:
- detect a previous location of the mobile device;
- detect a current location of the mobile device in relation to a first base station, wherein the instructions cause the mobile device to detect a signal strength of the mobile device with the first base station, determine the signal strength of the mobile device is decreasing, determine the mobile device is beyond a switch point, and use a second base station to track the current location of the mobile device;
- predict the future location of the mobile device based at least in part on the previous location of the mobile device, the current location of the mobile device, and a location history; and
- provide a location based service with the future location of the mobile device.

14. The non-transitory machine readable medium of claim 13, wherein the location history comprises a set of previously traveled paths by the mobile device.

15. The non-transitory machine readable medium of claim 13, wherein the instructions further cause the mobile device to:
- detect a base station group beyond the switch point; and
- select the second base station from the base station group.

16. The non-transitory machine readable medium of claim 13, wherein the switch point is the intersection between a coverage area of the first base station and a coverage area of the second base station.

17. The non-transitory machine readable medium of claim 13, wherein the location history comprises a set of previously traveled paths by a plurality of mobile devices.

18. The non-transitory machine readable medium of claim 13, wherein the signal strength indicates a distance between the mobile device and the first base station.

* * * * *